No. 847,387. PATENTED MAR. 19, 1907.

W. WHITE.

SYSTEM OF WASHING AND FILLING LOCOMOTIVE BOILERS.

APPLICATION FILED SEPT. 20, 1906.

3 SHEETS—SHEET 1.

No. 847,387. PATENTED MAR. 19, 1907.
W. WHITE.
SYSTEM OF WASHING AND FILLING LOCOMOTIVE BOILERS.
APPLICATION FILED SEPT. 20, 1906.

3 SHEETS—SHEET 2.

Witnesses:
Chas. E. Gaylord.
John Endres.

Inventor:
William White,
By Thomas F. Sheridan,
Atty.

No. 847,387. PATENTED MAR. 19, 1907.
W. WHITE.
SYSTEM OF WASHING AND FILLING LOCOMOTIVE BOILERS.
APPLICATION FILED SEPT. 20, 1906.
3 SHEETS—SHEET 3.
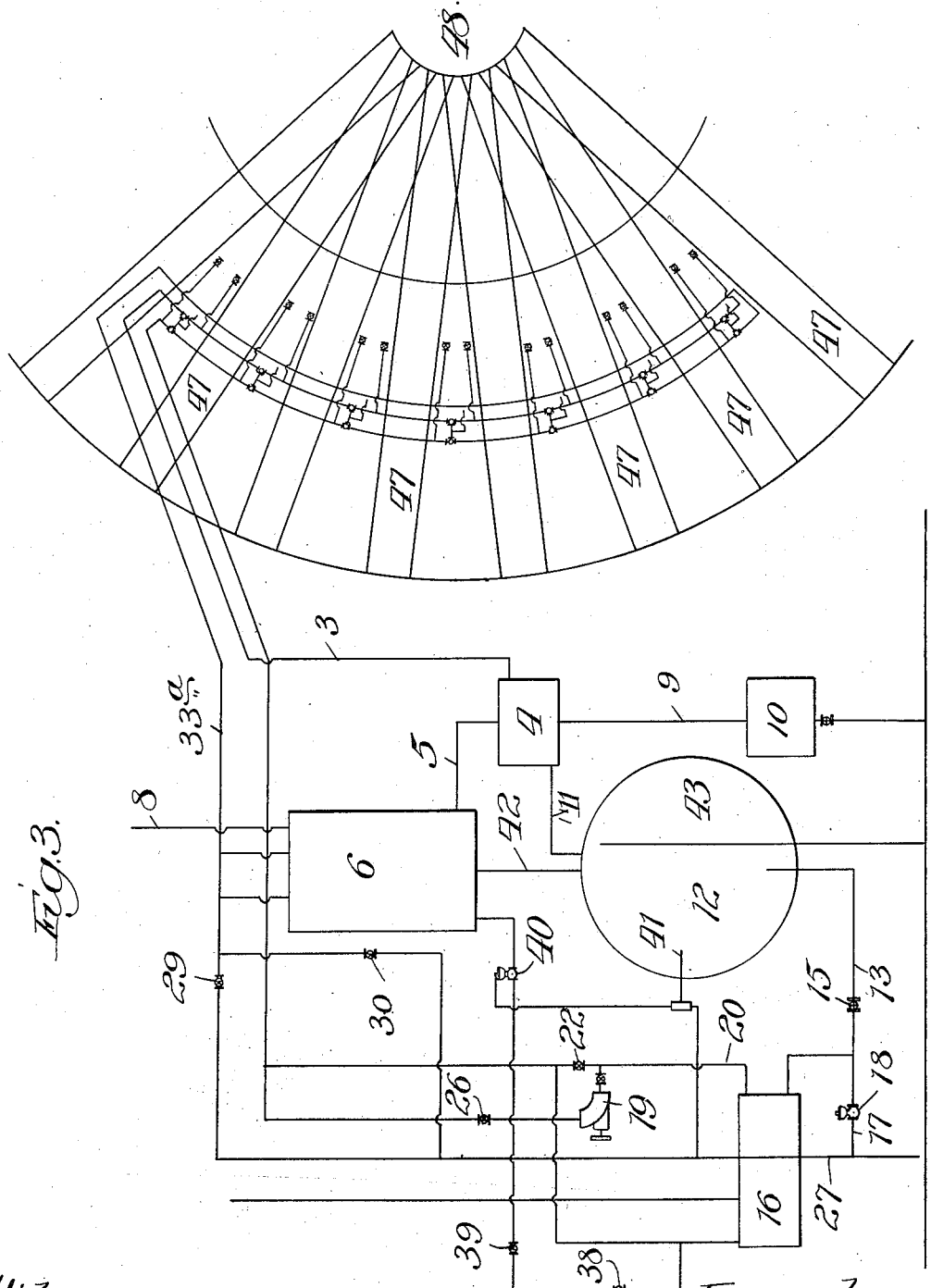

UNITED STATES PATENT OFFICE.

WILLIAM WHITE, OF CHICAGO, ILLINOIS.

SYSTEM OF WASHING AND FILLING LOCOMOTIVE-BOILERS.

No. 847,387.     Specification of Letters Patent.     Patented March 19, 1907.

Application filed September 20, 1906. Serial No. 335,442.

*To all whom it may concern:*

Be it known that I, WILLIAM WHITE, a citizen of the United States, residing at Chicago, in the county of Cook and State of Illinois, have invented certain new and useful Improvements in Systems of Washing and Filling Locomotive-Boilers, of which the following is a specification.

My invention relates to locomotive-boiler-washing systems, and has for its object the provision of an economic system for using the steam and water taken from locomotives brought into the roundhouse for washing out locomotives and for heating additional water to be used for the same purpose and for refilling the locomotives.

Other objects of my invention are the provision of automatically-controlled valves, whereby the temperature of the water for washing purposes may be controlled and whereby the system may be operated with the least possible manual attention.

My invention is illustrated in the accompanying drawings, in which—

Figure 1:
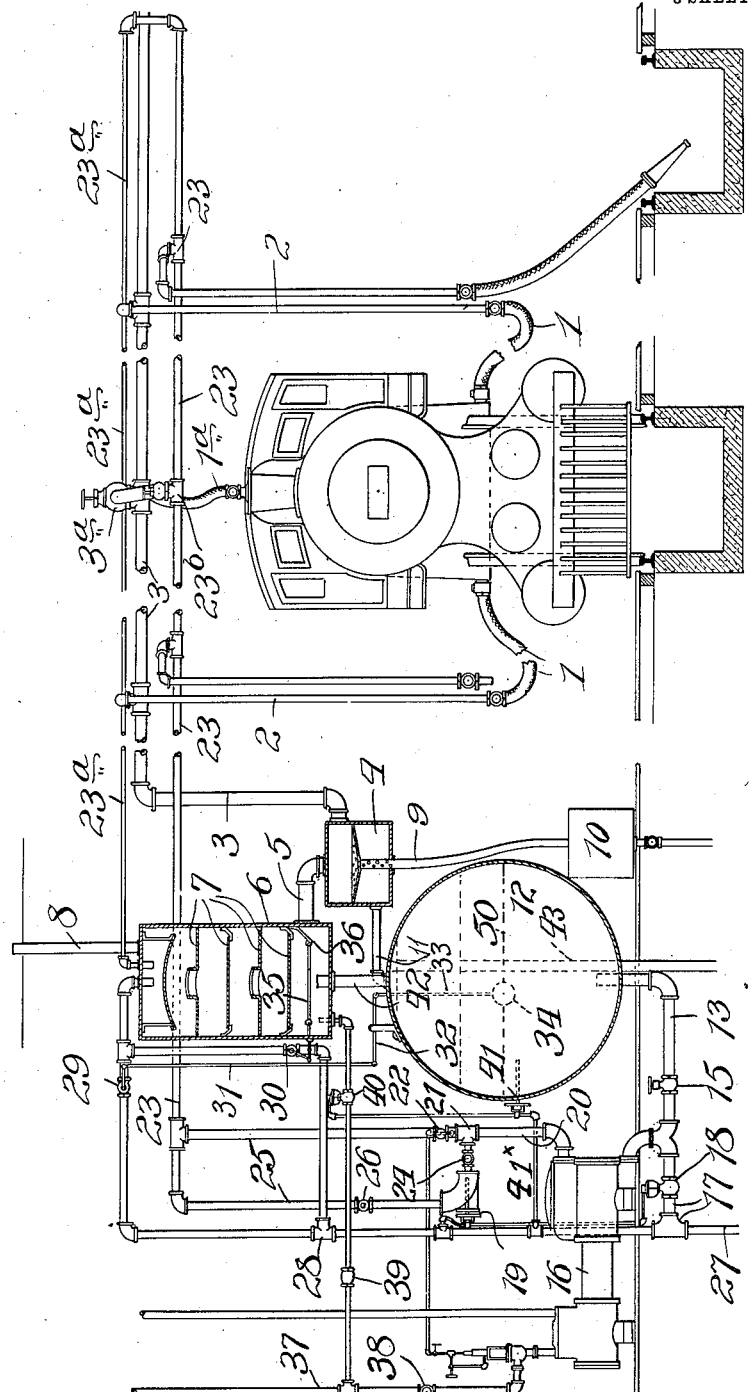
Figure 2:
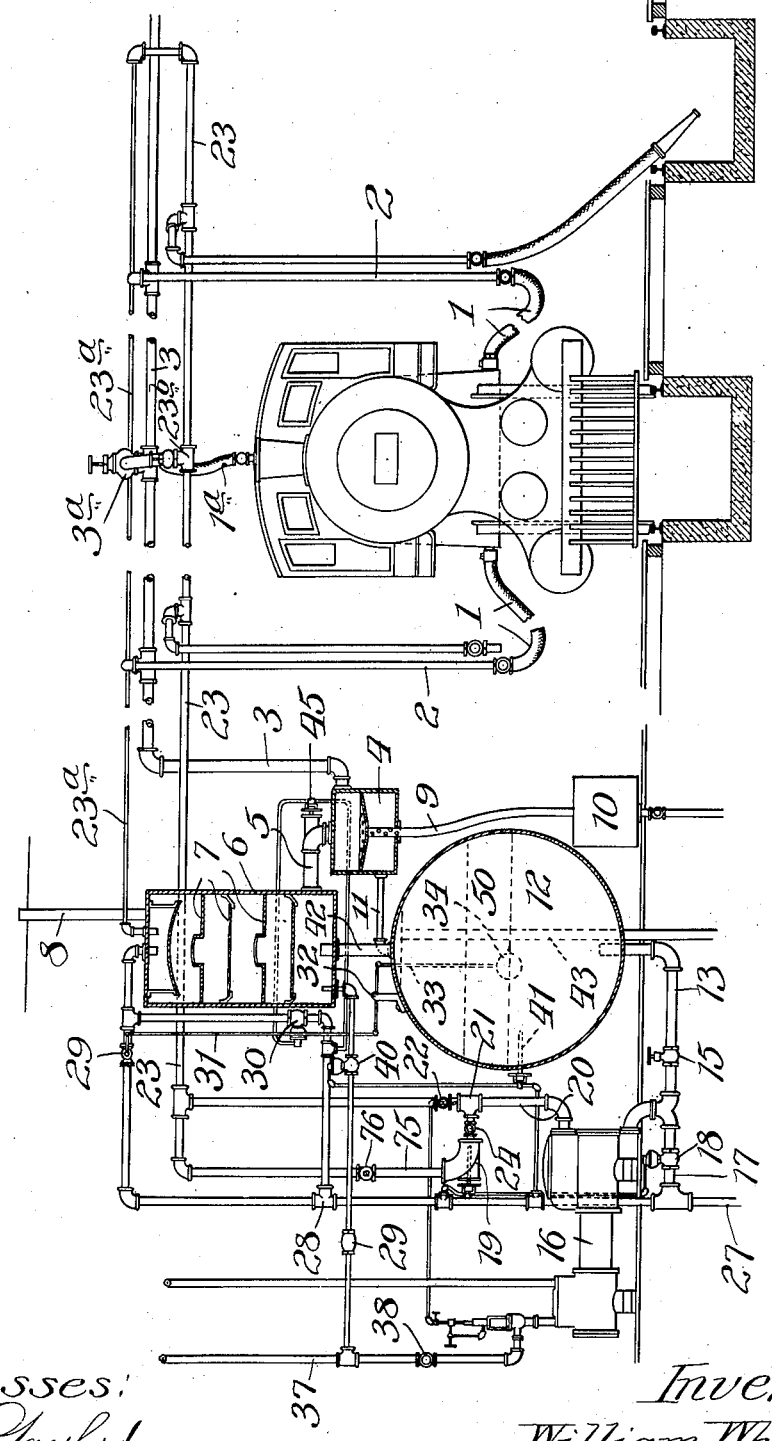

Figure 1 represents certain parts of a roundhouse in elevation, showing a locomotive and the details of the connections of the different parts of my system when constructed under one form. Fig. 2 is a similar elevation in which one of the valves is controlled by a different means than that shown in Fig. 1. Fig. 3 is a diagrammatic representation of a roundhouse and the piping and apparatus of my washer system.

Referring to Fig. 1, I have shown a locomotive connected, through flexible hose 1 and pipes 2 and 3, with the upper portion of a filtering and separating chamber 4. From the top of this chamber the steam-pipe 5 extends into the water-heater 6, which is provided with a plurality of horizontal shelves 7, arranged one above the other, and at the top with a vapor-opening 8, which leads to the free air. The filtering and separating chamber is provided with a drain-pipe 9, leading from the base of the chamber to the sludge-chamber 10, and with the filtered-water exit 11, which connects with the top of the main storage-tank 12. Leading from the base of tank 12 is the exit-pipe 13, provided with a valve 15 and connecting with the suction side of the steam-pump 16. Also connecting with the suction side of this pump is a cold-water-supply pipe 17, having the valve 18 therein which is controlled by the thermostat 19. The pressure-water exit 20, leading from the pump, is provided with a T 21, one branch of which leads, through the valve 22, directly to the distributing-pipe 23, while the other branch leads, through the valve 24, to the thermostat 19 and by way of the by-pipe 25 and valve 26 also connects with the distributing-pipe 23, which after connecting with all of the pits finally connects with pipe 23$^a$, which leads back to the heating-tank. In order that the same connecting-hose may be used to admit water to and extract steam from the top of the boiler, the valves 3$^a$ and 23$^b$ are connected by a pipe to which the hose 1$^a$ is connected. The cold-water-supply pipe 27 leads directly to the T-joint 28, and thence by way of one branch through the automatically-controlled valve 29 to the top of heater 7 and by way of the other branch through the automatically-controlled valve 30 to the top of the tank through the same opening. This automatically-controlled valve 29 is connected by rod 31, lever 32, and rod 33 with the float 34 and is adapted to be opened whenever the float falls below a predetermined line in the storage-tank. The valve 30 is connected by a rod 35 with the hinged gate 36, which is adapted to be moved by steam passing from the pipe 5 into the heating-tank. An opening in the base of the heating-tank 6 is connected by the pipe 42 with the top of the storage-tank, which is supplied with the overflow-pipe 43, which reaches almost to the top of the tank. The live-steam pipe 37 supplies steam through the throttle-valve 38 for operating the pump and also through the manually-operated cut-off 39 and diaphragm-valve 40 to the lower part of the heating-tank. The valve 40 is controlled by the thermostat 41, which extends into the storage-tank and is controlled by the temperature of the water therein, the thermostat admitting pressure to valve 40 through pipe 41$^\times$.

Referring to Fig. 2, the valve 30 is controlled by means of thermostat 45, which is located in the pipe 5, connected between the filtering and separating chamber and the heating-chamber.

Referring to Fig. 3, in which the designation-symbols applied to Fig. 1 have been used as far as applicable, such figure showing diagrammatically in addition to that shown in Fig. 1 the layout of piping for the entire roundhouse, 47 representing the pits over which the locomotives stand while being washed, and 48 representing the turn-table for directing the locomotives on any of the several radiating tracks.

In the operation of my system the locomotive is brought into the roundhouse full of hot water and steam, and the flexible pipes 1 are connected to the several outlets shown in the drawing, and the valves are opened, so that the pressure in the boiler will force the water and steam through the pipe 3 into the upper part of the filtering and separating tank 4. From this tank the steam passes directly through the pipe 5 into the heater 6, where it is brought into contact with sufficient amount of cold water to form a mixture of the desired temperature to be admitted into the storage-tank 12, as will be hereinafter described. The water which is carried off from the engine contains a large amount of scaly sediment, which passes, together with a small amount of water, through the pipe 9 into the sludge-tank 10. The hot water which passes through the filter in the chamber 4 is carried directly to the storage-tank by the pipe 11. The water in the storage-tank is normally maintained at the level shown by the dotted line 50, Fig. 1, and whenever the water is drawn off so that it falls below this line the float 34 will sink, and thereby operate the valve 29, which admits cold water to the top of the heating-tank and which will eventually bring the water-level again to its normal position in the storage-tank. Whenever the condition is such that cold water pours into the top of the heating-tank when steam is not being admitted through the pipe 5, it is necessary in order to maintain the temperature of the water in the storage-tank at a predetermined degree to admit live steam into the lower part of the heating-tank. This is done by means of the valve 40, which is regulated by the thermostat 41, the latter being governed by the temperature of the water in the storage-tank. It will be seen that when the water in the tank decreases in temperature sufficiently to open the valve 40 steam will be admitted into the heating-tank and hot water will be caused to pass down the pipe 42 and into the storage-tank.

The pump 16 normally draws its supply of hot water from the base of the storage-tank. As this water is maintained at a higher temperature than is desirable for washing out engines, the pipe after leaving the pump is divided into two parallel by-paths, one way being provided with a thermostat 19, which controls the valve 17, and thereby admits cold water into the suction side of the pump when the temperature of the water as it passes the thermostat is greater than is desired for washing purposes. When it is desired to fill the boiler of the engine before again starting the locomotive out, the valve 24 is closed and the valve 22 is opened, so that the thermostat will become inoperative and all of the water will be drawn from the storage-tank, thereby furnishing the water for the boiler at a higher temperature than would be necessary or desirable for washing purposes. When it is desired to furnish cold water to the supply-pipe 23 for scrubbing purposes during the day or for filling boilers which are not to be fired immediately, the valve 15 in the hot-water-supply pipe is closed and the valve 18, which may also be manually controlled, is opened, so that all the water which passes through the pump will be taken directly from the cold-water-supply pipe 27 and will pass directly through the pipe 20 and valve 22, which will then be opened to the supply-pipe 23.

One branch of the cold-water-supply pipe, which leads to the top of the heating-tank, is provided with the valve 30, which is connected, through the rod 35, with the hinged gate 36, within the lower part of the heating-tank. The steam, which enters the heating-tank through pipe 5, will open the gate 36 to a greater or less angle in proportion to the amount of steam being passed in, and at the same time the valve 30 will be operated to admit cold water in a proper proportion to make the resulting mixture of substantially the temperature desired in the storage-tank. The variation shown in Fig. 2 consists in controlling this cold-water supply to the heating-tank by means of the thermostat, which is governed by the temperature of the steam which is admitted to the heating-tank. Details of this heating-tank and of the filtering and separating tank having been described in my former application, Serial No. 319,909, and forming no part of this invention are not here specifically described.

It will be understood that while I have shown my invention of a specific form and have described it with relation thereto I do not wish to be unduly limited to this specific arrangement, it being understood that many variations and combinations may be made without departing from the spirit or scope of my invention.

I claim—

1. A locomotive-boiler washing and filling system, comprising a washout and filling water supply reservoir, means for automatically regulating the temperature of the water therein, means for distributing the water from the supply-tank, and further means for regulating the temperature of the distributed water.

2. A locomotive-boiler washing and filling system, comprising means for separating the steam and water taken from the boiler, means for heating other water by the steam, means for storing such heated water with the boiler-water, and means for distributing this water for washing and filling boilers.

3. A locomotive-boiler washing and filling system, comprising means for separating the steam and water taken from the boiler, means for heating other water by the steam, means for automatically regulating the amount of water heated by such steam, means for storing such heated water with the boiler-water, and means for distributing this water for washing and filling boilers.

4. A locomotive-boiler washing and filling system, comprising means for separating the steam and water taken from the boiler, means for heating other water by the steam, means for automatically regulating the amount of water so heated, means for storing such heated water with the boiler-water, means for regulating the temperature of the stored water, and means for distributing this water for washing and filling boilers.

5. A locomotive-boiler washing and filling system, comprising means for separating the steam and water taken from the boiler, means for heating other water by the steam, means for automatically regulating the amount of water so heated, means for storing such heated water with the boiler-water, means for regulating the temperature of the water so stored, means for distributing this water for washing and filling boilers, and further means for regulating the temperature of the distributed water.

6. A locomotive-boiler washing and filling system, comprising a separator in which the steam and water from the boiler are separated, an open heater in which the steam is utilized for heating other water, a cold-water supply opening for said open heater, means to govern the supply of cold water by the supply of steam, a storage-tank in which water from the heater and water from the separator are stored, means for regulating the temperature of the water in the storage-tank, a distributing-pipe leading from the storage-tank, a cold-water-supply pipe, and means for automatically admitting cold water to the water from the storage-tank in sufficient quantities to regulate the temperature of the distributed water for washing purposes.

7. A locomotive-boiler washing and filling system, comprising a separator for separating the steam and water taken from the boiler, an open heater in which the steam is adapted to be mixed with cold water, an automatically-controlled valve for regulating the supply of cold water by the supply of steam, a storage-tank in which the heated water and the water from the boilers are stored, a live-steam-supply pipe, means depending upon the temperature of the water in the storage-tank for admitting live steam to the open heater, means depending upon the depth of the water in the storage-tank for admitting cold water to the open heater, means for distributing water from the storage-tank to the different parts of the roundhouse, means for regulating the temperature of the distributed water, and means for maintaining a circulation of the distributed water about the roundhouse.

8. A locomotive-boiler washing and filling system, comprising a single pipe-line for washout and filling water, and means for delivering to the pipe hot, cold or tempered water.

WILLIAM WHITE.

Witnesses:
 CHARLES F. FITTS,
 CLIFFORD C. BRADBURY.